United States Patent
Dudar

(10) Patent No.: US 10,017,187 B2
(45) Date of Patent: Jul. 10, 2018

(54) VEHICLE PROPULSION COOLING

(71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/007,602

(22) Filed: Jan. 27, 2016

(65) Prior Publication Data

US 2017/0210391 A1    Jul. 27, 2017

(51) Int. Cl.
| | | |
|---|---|---|
| B60W 50/00 | (2006.01) |
| B60H 1/00 | (2006.01) |
| B60W 10/04 | (2006.01) |
| B60W 10/30 | (2006.01) |
| B60K 11/06 | (2006.01) |
| B60W 40/08 | (2012.01) |

(52) U.S. Cl.
CPC ..... *B60W 50/0098* (2013.01); *B60H 1/00064* (2013.01); *B60H 1/00778* (2013.01); *B60H 1/00878* (2013.01); *B60H 1/00978* (2013.01); *B60K 11/06* (2013.01); *B60W 10/04* (2013.01); *B60W 10/30* (2013.01); *B60W 2040/0881* (2013.01); *B60W 2510/30* (2013.01); *B60W 2550/12* (2013.01); *B60W 2710/0688* (2013.01)

(58) Field of Classification Search
None
See application file for complete search history.

(56) References Cited

U.S. PATENT DOCUMENTS

| | | | | |
|---|---|---|---|---|
| 5,224,335 A * | 7/1993 | Yoshizaki | ............. | F01N 3/2026 60/277 |
| 5,769,055 A * | 6/1998 | Motose | .................... | F01P 11/16 123/198 D |
| 5,927,248 A * | 7/1999 | Lang | ........................ | F01N 9/00 123/396 |
| 6,026,679 A | 2/2000 | Holmes et al. | | |
| 6,672,085 B1 * | 1/2004 | Sangwan | ............... | B60H 1/008 62/126 |
| 7,004,245 B2 | 2/2006 | Abdeljawad | | |
| 7,533,637 B2 * | 5/2009 | Soderberg | .......... | B60H 1/00271 123/41.15 |

(Continued)

FOREIGN PATENT DOCUMENTS

| | | |
|---|---|---|
| JP | 2220916 A | 9/1990 |
| JP | 3733550 B2 | 1/2006 |
| WO | WO 2009054559 A1 | 4/2009 |

OTHER PUBLICATIONS

AAMCO online article, 7 Steps to Take if Your Car Overheats, Jan. 23, 2012 http://www.aamcovenice.com/7-steps-to-take-if-your-car-overheats/.*

(Continued)

Primary Examiner — Redhwan K Mawari
Assistant Examiner — Edward Torchinsky
(74) Attorney, Agent, or Firm — Frank A. MacKenzie; Bejin Bieneman PLC

(57) ABSTRACT

A temperature of a vehicle propulsion subsystem is measured. At least two countermeasures are actuated, including actuating a vehicle climate control subsystem and opening at least one vehicle window when the temperature exceeds a first threshold.

20 Claims, 3 Drawing Sheets

(56) References Cited

U.S. PATENT DOCUMENTS

| | | | |
|---|---|---|---|
| 2005/0046584 A1* | 3/2005 | Breed | B60C 11/24 |
| | | | 340/13.31 |
| 2008/0076342 A1* | 3/2008 | Bryant | B60H 1/00735 |
| | | | 454/75 |
| 2008/0125941 A1 | 5/2008 | Mitteer | |

OTHER PUBLICATIONS

AutoLab USA online article, "What to do if your Vehicle Overheats", Oct. 8, 2012 http://www.autolabusa.com/car-care-tips/What-To-Do-If-Your-Vehicle-Overheats_/.*

* cited by examiner

VEHICLE PROPULSION COOLING

BACKGROUND

Vehicle propulsion subsystems typically produce large amounts of heat, which may damage propulsion components. Vehicles typically include dedicated cooling subsystems to remove excess heat from the propulsion subsystem. A problem arises when the propulsion subsystem produces more heat than a dedicated cooling subsystem is able to remove, increasing a temperature of the propulsion subsystem and/or components thereof beyond an acceptable limit.

DETAILED DESCRIPTION

When a vehicle propulsion subsystem produces more heat than a dedicated cooling subsystem can remove, e.g., when a cooling subsystem is damaged, other vehicle subsystems can be activated to remove excess heat and cool the propulsion subsystem. One such subsystem is a climate control subsystem, conventionally used to heat or cool vehicle cabin air. As disclosed herein, the climate control subsystem can be advantageously activated to heat vehicle cabin air so that the climate control subsystem extracts the heat from the propulsion subsystem, cooling the propulsion subsystem while heating the cabin. For example, in an autonomous vehicle, a control computer (sometimes referred to as the "virtual operator") may be programmed to activate the climate control subsystem without user input, and even in the absence of a user, when a temperature of a propulsion subsystem, e.g., one of an engine coolant temperature and a cylinder head temperature, exceeds a predetermined threshold.

Figure 1:
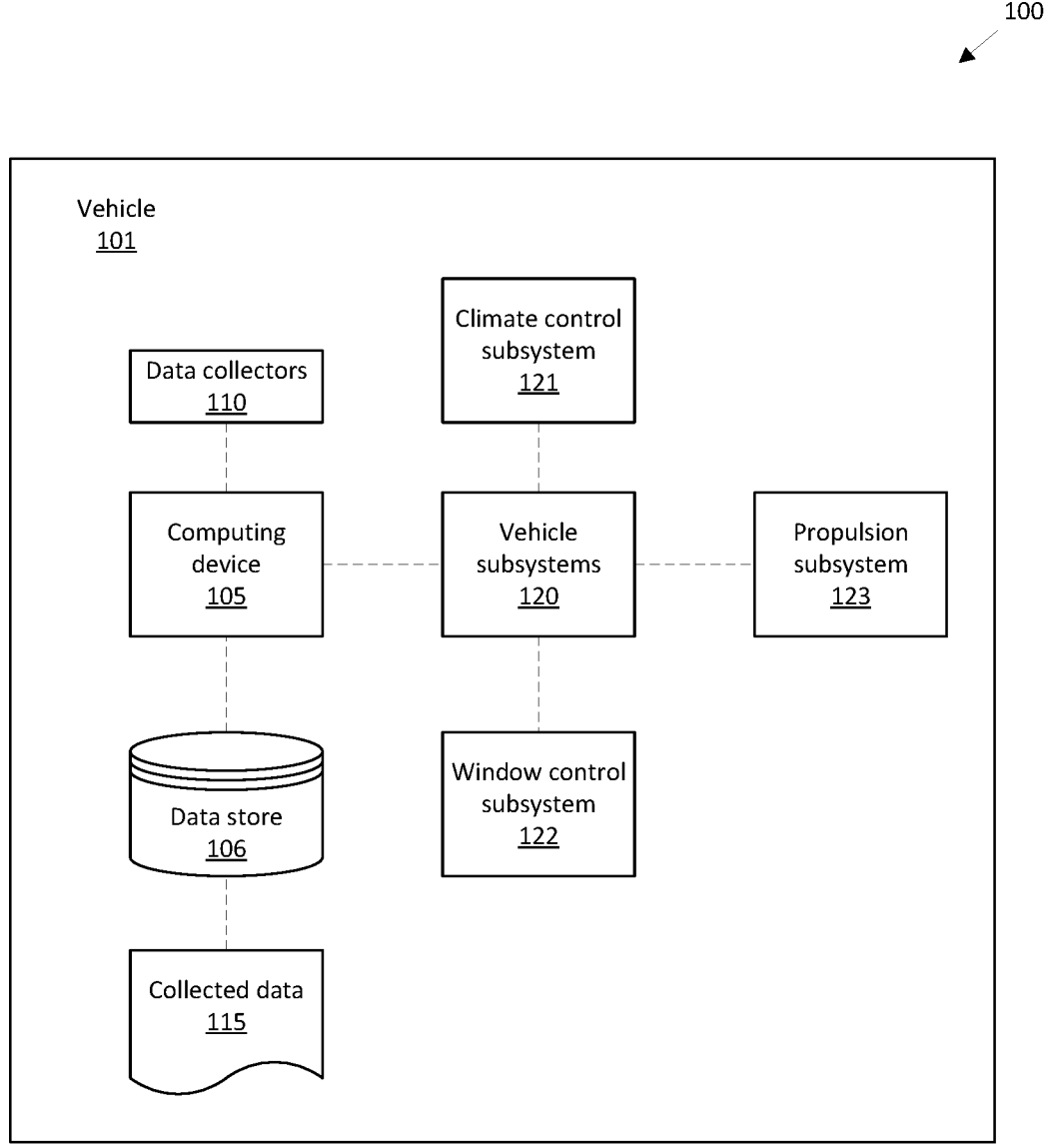
FIG. 1 is a block diagram of an example vehicle system for cooling a vehicle propulsion subsystem.

FIG. 1 illustrates an exemplary vehicle 101 system 100 for cooling a vehicle 101 propulsion subsystem 123. A computing device 105 is programmed to receive collected data 115 from one or more data collectors 110, e.g., vehicle 101 sensors, related to operation of the vehicle 101. For example, the data 115 may include, and/or may provide a basis for determining, a velocity of the vehicle 101, vehicle 101 acceleration and/or deceleration, data related to vehicle 101 path or steering, etc., including lateral acceleration, curvature of the road, etc. Further examples of data 115 may include measurements of vehicle 101 systems and components (e.g. a steering system, a powertrain system, a brake system, internal sensing, external sensing, etc.).

The computing device 105 may be programmed to provide a virtual operator as described herein, and is generally programmed for communications on a controller area network (CAN) bus or the like. The computing device 105 may also have a connection to an onboard diagnostics connector (OBD-II). Via the CAN bus, OBD-II, and/or other wired or wireless mechanisms, the computing device 105 may transmit messages to various devices in a vehicle and/or receive messages from the various devices, e.g., controllers, actuators, sensors, etc., including data collectors 110. Alternatively or additionally, in cases where the computing device 105 actually comprises multiple devices, the CAN bus or the like may be used for communications between devices represented as the computing device 105 in this disclosure. In addition, the computing device 105 may be programmed for communicating with the network 120, which, as described below, may include various wired and/or wireless networking technologies, e.g., cellular, Bluetooth, wired and/or wireless packet networks, etc.

The data store 106 may be of any known type, e.g., hard disk drives, solid-state drives, servers, or any volatile or non-volatile media. The data store 106 may store the collected data 115 sent from the data collectors 110.

Data collectors 110 may include a variety of devices. For example, various controllers in a vehicle may operate as data collectors 110 to provide data 115 via the CAN bus, e.g., data 115 relating to vehicle 101 speed, acceleration, system and/or component functionality. In addition to providing data 115 concerning a host vehicle 101, the data collectors 110 can provide data 115 relating to one or more second (target) vehicles. Further, sensors or the like, global positioning system (GPS) equipment, etc., could be included in a vehicle and configured as data collectors 110 to provide data directly to the computer 105, e.g., via a wired or wireless connection. Sensor data collectors 110 could include mechanisms such as RADAR, LIDAR, sonar, etc. sensors that could be deployed to determine environmental data, e.g., to measure a distance between the vehicle 101 and other vehicles or objects, identify objects (and/or types of objects) near the vehicle 101 and/or an anticipated trajectory thereof, road conditions (e.g., a coefficient of friction, presence of moisture, ice, etc.), locations of roads and traffic signs, etc. Yet other data collectors 110 could include cameras, breathalyzers, motion detectors, etc., i.e., data collectors 110 to provide data 115 for evaluating a condition or state of a vehicle 101 operator. Example data collectors 110 include engine coolant temperature sensors and cylinder head temperature sensors.

Collected data 115 may include a variety of data collected in a vehicle 101. Examples of collected data 115 are provided above, and, moreover, data 115 is generally collected using one or more data collectors 110, and could additionally include data calculated therefrom in the computing device 105. In general, collected data 115 may include any data that may be gathered by the data collectors 110 and/or computed from such data.

The vehicle 101 can include a plurality of subsystems 120. The subsystems 120 typically include, e.g., a propulsion subsystem 123 (e.g., throttle for an internal combustion engine), a steering subsystem, and a braking subsystem, and often further include other subsystems 120, such as a climate control subsystem 121, an entertainment subsystem, a navigation subsystem, etc. The computing device 105 may be programmed to operate some or all of the subsystems 120 with limited or no input from a human operator, i.e., autonomously. Such programming may be referred to as the "virtual operator." The virtual operator includes programming to monitor and/or control one or more subsystems 120, e.g., to provide instructions, e.g., via a vehicle 101 communications bus and/or to electronic control units (ECUs) as are known and that may be included in various subsystems 120, to actuate vehicle components, e.g., to apply brakes, change a steering wheel angle, etc. When the computing device 105 operates a subsystem 120 autonomously, this means that the computing device 105 ignores at least some input from the human operator with respect to the subsystems 120 selected for control by the virtual operator. For example, if the human operator attempts to press a gas pedal during virtual operator propulsion operation, the computing device 105 may ignore the human-entered command to increase throttle and accelerate the vehicle 101 according to its programming. For the vehicle 101 to be operated autonomously (sometimes referred to as "fully autonomously") means that each of a steering, braking, and propulsion are operated by the computer 105 without human input. For the vehicle 101 to be operated semi-autonomously means that at least one but not all of braking, propulsion, and steering are operated by the computer 105 without human input.

One of the subsystems 120 may be a climate control subsystem 121. The climate control subsystem 121 adjusts the ambient temperature in the vehicle 101 cabin, i.e., increases or decreases the temperature based on an operator input, e.g., a request for the ambient cabin temperature to be 72 degrees Fahrenheit. To increase the temperature of the vehicle 101 cabin, the climate control subsystem 121 may receive heat from a propulsion subsystem 123, cooling the propulsion subsystem 123.

Another vehicle subsystem 120 may be a window control subsystem 122. The window control subsystem 122 is programmed to adjust a height of movable vehicle 101 windows, e.g., the operator and passenger windows. Opening the vehicle 101 windows may allow hot ambient air in the vehicle 101 cabin to escape and cooler outdoor air to enter the cabin, where it may be heated by the climate control subsystem 121, cooling the propulsion subsystem 123.

Another vehicle subsystem 120 may be the propulsion subsystem 123. The propulsion subsystem 123 propels the vehicle 101 by, e.g., an internal combustion engine, an electric motor, etc. The propulsion subsystem 123 may include components such as a fuel supply, a coolant line, a throttle, an engine cylinder, and/or a battery. The propulsion subsystem 123 typically generates heat as a byproduct of the generated propulsion. Coolants such as are known may be used to mitigate the generated heat, but the temperature may rise faster than such coolants can cool the propulsion subsystem 123.

Figure 2:
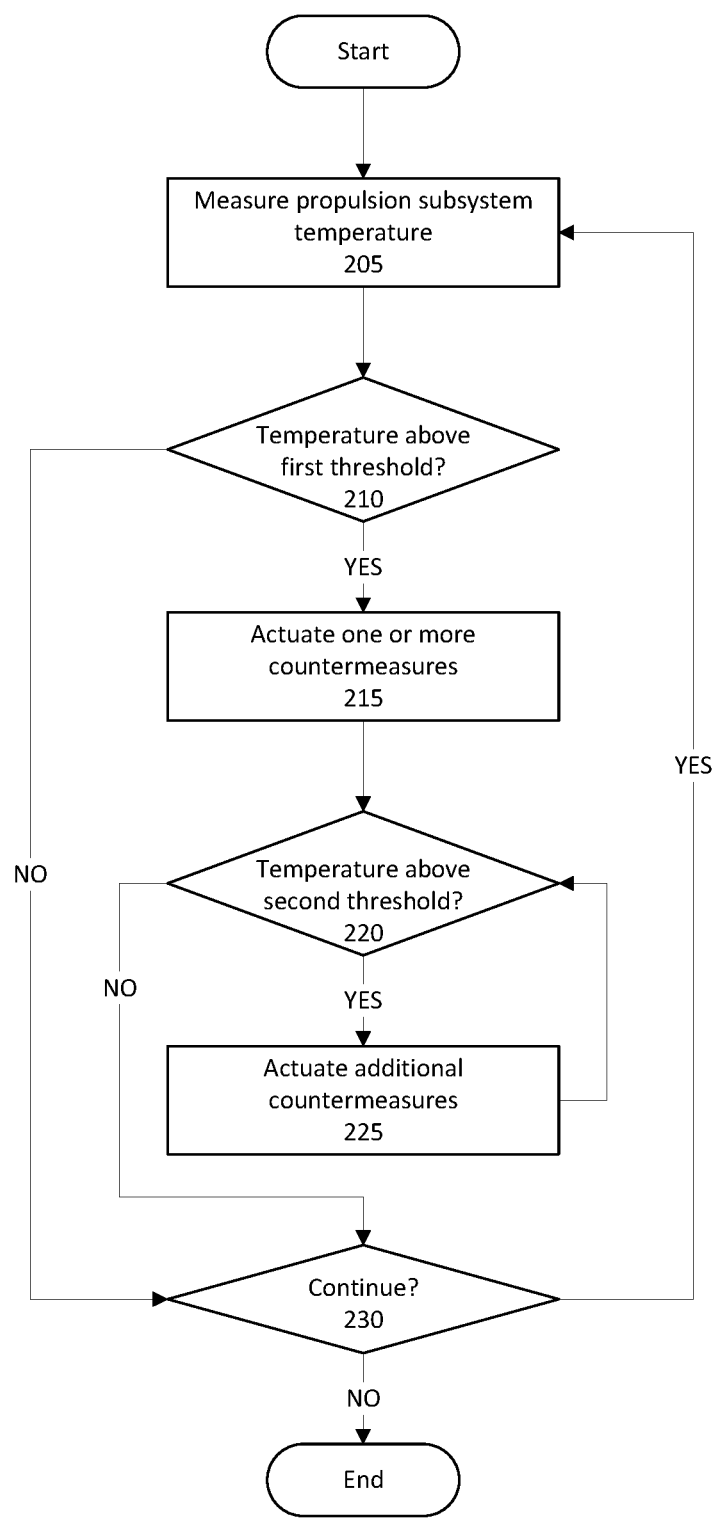
FIG. 2 is an example process for cooling the vehicle propulsion subsystem of FIG. 1.

FIG. 2 illustrates a process 200 for cooling a propulsion subsystem 123. The process 200 begins in a block 205, in which the computing device 105 measures the propulsion subsystem 123 temperature with one or more data collectors 110, e.g., one or more temperature sensors such as are known to measure a temperature at locations in an engine compartment. The propulsion subsystem temperature may be one or a combination of, e.g., an engine cylinder head temperature (CHT) or a coolant temperature. The CHT is the temperature of an engine cylinder head, as is known, as measured by a cylinder head temperature sensor. The coolant temperature is the temperature of an engine coolant, as is known, as measured by a coolant temperature sensor.

Next, in a block 210, the computing device 105 compares the measured propulsion subsystem 123 temperature to a first predetermined temperature threshold. The first threshold may be determined by, e.g., known safe operating temperatures for a propulsion subsystem 123. An example first threshold may be 220° F. If the propulsion temperature is higher than the first threshold, the process 200 continues in a block 215. Otherwise, the process 200 continues in a block 230.

In the block 215, the computing device 105 actuates a first countermeasure to reduce the propulsion subsystem 123 temperature. The countermeasures are specific ways of actuating certain vehicle subsystems 120 to cool the propulsion subsystem 123.

One countermeasure is to activate the climate control subsystem 121 to pull heat from the propulsion subsystem 123. A climate control subsystem 121, when activated to heat a vehicle 101 cabin, typically receives air heated from the propulsion subsystem 123 via a heat exchanger. This cools the propulsion subsystem 123 and heats the vehicle 101 cabin. When the propulsion subsystem 123 temperature is high, activating the climate control subsystem 121 may reduce the propulsion temperature enough to prevent damage to the propulsion subsystem 123. Because increasing the cabin temperature with the climate control subsystem 121 may be uncomfortable for vehicle 101 occupants, the computing device 105 may be programmed to activate the climate control subsystem 121 only when seat detection sensors indicate that the vehicle 101 has no occupants, i.e., is operating fully autonomously. Because the increased vehicle 101 cabin temperature may be higher than a vehicle 101 occupant may find comfortable, the computing device 105 may be programmed to activate the climate control subsystem 121 only when an occupant sensor, such as is known, detects that the vehicle 101 is not occupied.

Another possible countermeasure is to actuate the window control subsystem 122 to open the vehicle 101 windows. The air inside the vehicle 101 may be warmer than the ambient outdoor temperature. Therefore, opening the vehicle 101 windows may allow cooler air to enter the vehicle 101. When the climate control subsystem 121 pumps hot air into the vehicle 101 cabin, opening the windows allows the hot air to escape and brings cooler air into the climate control subsystem 121, improving the heat reduction of the propulsion subsystem 123. Because open windows may allow precipitation into the vehicle 101, the computing device 105 may be programmed, especially where a vehicle 101 is occupied by human occupants as indicated by data from data collectors 115 that may be provided in a known fashion (e.g., weight sensors, image sensors, etc.) and/or depending on an interior of the vehicle 101, to actuate the window control subsystem 122 only when a precipitation sensor indicates that there is substantially no precipitation, or when precipitation is below a predetermined intensity, or when the vehicle 101 is unoccupied. Furthermore, the computing device 105 may be programmed to open the vehicle 101 windows only when the climate control subsystem 121 is actuated to improve propulsion cooling.

Yet another possible cooling countermeasure is to deactivate the propulsion subsystem 123. Some propulsion subsystems 123, e.g., internal combustion engines, only produce heat when activated. Thus, stopping the propulsion subsystem 123 may prevent further increase of propulsion subsystem 123 temperature and allow reduction of propulsion subsystem 123 temperature over time. The climate control subsystem 121 and window control subsystem 122 may be used in conjunction with stopping the propulsion subsystem 123 to further reduce the propulsion subsystem 123 temperature. Because the vehicle 101 may be operating in the middle of a road when the propulsion subsystem 123 is to be cooled, the virtual operator may be programmed to control vehicle subsystems 120 to move the vehicle 101 to a safe stopping zone, e.g., a road shoulder, a parking lot, etc. After the propulsion subsystem 123 is deactivated, because coolant is conventionally circulated with a pump powered by a vehicle 101 crankshaft (which is powered by the propulsion subsystem 123), the computing device 105 may actuate an electric coolant subsystem to circulate a coolant even when the propulsion subsystem 123 is deactivated.

Yet another possible cooling countermeasure is to open a vehicle 101 hood. Propulsion subsystems 123 are typically housed in closed compartments in vehicles 101 that do not allow much circulation of air. Opening the vehicle 101 hood exposes the propulsion subsystem 123 to cooler ambient air, reducing the propulsion temperature. Because opening the vehicle 101 hood may be unsafe while the vehicle 101 is operating, the virtual operator may be programmed to open the vehicle 101 hood only when the other countermeasures listed above have already been activated and/or when the vehicle 101 is stopped. The vehicle 101 hood may include an electromagnetic valve actuated by the computing device 105 to open the vehicle 101 hood.

In the block 215, the computing device 105 actuates one or more of the foregoing countermeasures, typically actuating the climate control subsystem 121 to cool the propulsion subsystem 123. Two or more of the foregoing countermeasures could be actuated, e.g., the computing device 105 may actuate the climate control subsystem 121 and the window control subsystem 122 in the block 215 to heat the vehicle 101 cabin air and vent the heated air from the vehicle 101.

Next, in a block 220, the computing device 105 measures the propulsion subsystem 123 temperature and compares the propulsion subsystem 123 temperature to a second predetermined temperature threshold. The second threshold may be higher than the first threshold, i.e., the propulsion subsystem 123 temperature may be rising beyond the first threshold despite actuation of a first countermeasure as described in the block 215. An example second threshold is 240° F. If the propulsion temperature is above the second threshold, the process 200 continues in a block 225. Otherwise, the process 200 continues in the block 230.

In the block 225, the computing device 105 actuates one or more additional countermeasures. For example, the computing device 105 could actuate the window control subsystem 122 to open the vehicle 101 windows if the windows were not opened in the block 215 above. The process 200 then returns to the block 220 to determine whether the propulsion temperature is below the second threshold. If all available countermeasures are actuated, then the process 200 returns to the block 220.

Countermeasures may be actuated according to a predetermined sequence, i.e., order of priority, as blocks 215-225 are executed. For example, a first-actuated countermeasure could be to actuate the climate control subsystem 121 to vent propulsion subsystem 123 heat into the vehicle 101 cabin. A second countermeasure in a predetermined sequence could be to actuate the window control subsystem 122 to vent the heated cabin air and introduce cool ambient air to cool the propulsion subsystem 123 via the climate control subsystem 121. A third countermeasure could be to move the vehicle 101 to a safe space and stop the propulsion subsystem 123 while the climate control subsystem 121 and the window control subsystem 122 continue to remove heat from the propulsion subsystem 123. A fourth and possibly final countermeasure could be to open the vehicle 101 hood, exposing the propulsion subsystem 123 to the ambient air, to cool the propulsion subsystem 123. The sequence may continue until the propulsion temperature falls below one of the first temperature threshold and the second temperature threshold.

In the block 230, the computing device 105 determines whether the process 200 should continue. For example, if the vehicle 101 has reached an intended destination and is stopped, the vehicle 101 is powered down, etc., the computing device 105 may end the process 200. In another example, the propulsion subsystem 123 temperature could to below the first temperature threshold, whereupon further countermeasures are not warranted. If the computing device 105 determined not to continue, the process 200 ends. Otherwise, the process 200 returns to the block 205 to measure the propulsion temperature.

Figure 3:
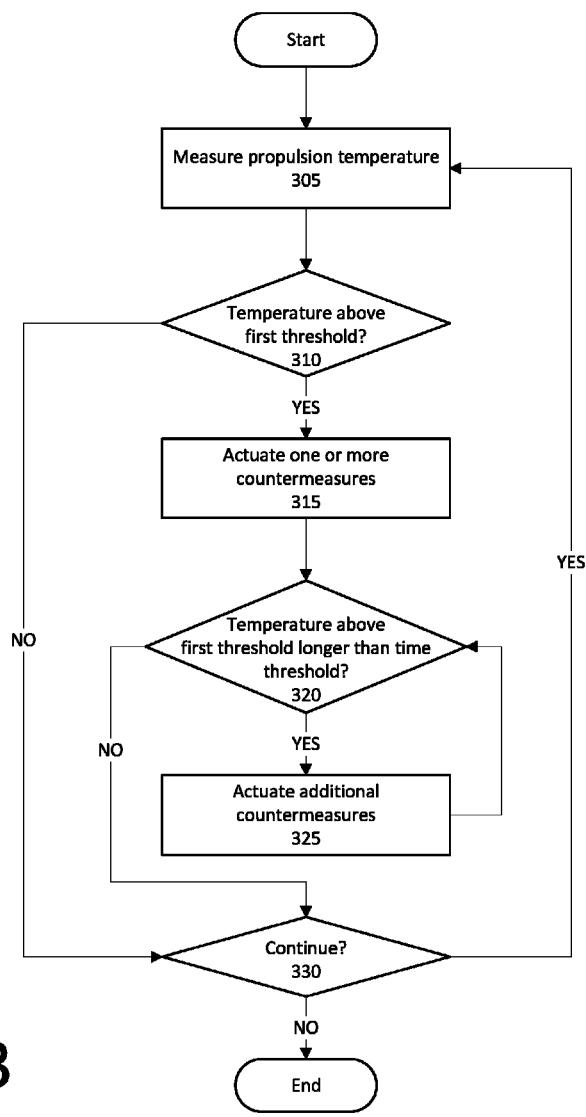
FIG. 3 is another example process for cooling the vehicle propulsion subsystem of FIG. 1.

FIG. 3 illustrates an example process 300 for implementing countermeasures to cool a propulsion subsystem 123. The process 300 begins in a block 305, in which the computing device 105 measures the propulsion subsystem 123 temperature with a data collector 110, e.g., as described above. The propulsion subsystem 123 temperature may be one of, e.g., an engine cylinder head temperature or a coolant temperature.

Next, in a block 310, the computing device 105 compares the measured propulsion subsystem 123 temperature to a first predetermined temperature threshold. The first threshold may be determined by, e.g., known safe operating temperatures for a propulsion subsystem 123. If the propulsion subsystem 123 temperature is higher than the first threshold, the process 300 continues in a block 315. Otherwise, the process 300 continues in a block 330.

In the block 315, the computing device 105 actuates one or more countermeasures such as described above, typically actuating the climate control subsystem 121 and/or the window control subsystem 122 to cool the propulsion subsystem 123.

Next, in a block 320, the computing device 105 determines if the propulsion temperature has stayed above the first threshold for longer than a predetermined time threshold. The time threshold may be predetermined by, e.g., predicted damage models based on time spent at specific propulsion temperatures, the size of the engine, the presence or loss of engine coolant, etc. An example time threshold may be 5 minutes for a smaller engine (e.g. a 4-cylinder engine) and 10 minutes for a larger engine (e.g. an 8-cylinder engine), the larger engine having more thermal mass to heat, and thus increasing temperature more slowly compared to a smaller engine. If the propulsion temperature remains above the first threshold for longer than the time threshold, then the process 300 continues in a block 325. Otherwise, the process 300 continues in the block 330.

In the block 325, the computing device 105 actuates additional countermeasures such as described above. For example, the computing device 105 may deactivate the propulsion subsystem 123. The process 300 then returns to the block 320 to determine whether the propulsion temperature is below the first threshold. The countermeasures may follow a predetermined sequence described above.

In the block 330, as in the block 230, the computing device 105 determines whether the process 300 should continue. If the computing device 105 determined not to continue, the process 300 ends. Otherwise, the process 300 returns to the block 305 to measure the propulsion temperature.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 200, one or more of the steps could be omitted, or the steps could be executed in a different order than shown in FIG. 2. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer including a processor and a memory, the memory storing instructions executable by the computer to:
    measure a temperature of a vehicle propulsion subsystem;
    determine a time threshold based at least in part on a thermal mass of the vehicle propulsion subsystem;
    actuate a first countermeasure when the temperature exceeds a first threshold;
    measure an elapsed time from when the temperature exceeds the first threshold;
    determine that the elapsed time exceeds the time threshold; and
    then, actuate a second countermeasure;
    wherein the countermeasures include actuating a vehicle climate control subsystem and opening at least one vehicle window.

2. The system of claim 1, wherein the countermeasures further include deactivating the propulsion subsystem and opening a vehicle hood.

3. The system of claim 1, wherein the instructions further include instructions to actuate opening the vehicle window when one of a precipitation sensor detects that there is substantially no precipitation and an occupant sensor detects that the vehicle is unoccupied.

4. The system of claim 1, wherein the countermeasures further include deactivating the propulsion subsystem and the instructions further include instructions to actuate an electric coolant subsystem to circulate a propulsion coolant when the propulsion subsystem is deactivated.

5. The system of claim 1, wherein countermeasures further include deactivating the propulsion subsystem and the instructions further include instructions to move the vehicle to a safe stopping zone before deactivating the propulsion system and opening the vehicle hood.

6. The system of claim 1, wherein the instructions further include instructions to determine whether the vehicle is occupied and to actuate the climate control system only when the vehicle is not occupied.

7. The system of claim 1, wherein the countermeasures further include deactivating the propulsion subsystem and opening a vehicle hood, and the instructions include instructions to actuate the countermeasures in a predetermined sequence, the sequence being actuating the climate control subsystem, opening the vehicle window, moving to a safe stopping zone and deactivating the propulsion system, and opening the vehicle hood.

8. The system of claim 1, wherein the instructions further include instructions to actuate another countermeasure when the temperature exceeds a second threshold.

9. The system of claim 1, wherein the temperature is at least one of a cylinder head temperature and an engine coolant temperature.

10. A method, comprising:
    measuring a temperature of a propulsion subsystem with a temperature sensor;
    determining a time threshold based at least in part on a thermal mass of the vehicle propulsion subsystem;
    actuating a first countermeasure when the temperature exceeds a first threshold;
    measuring an elapsed time from when the temperature exceeds the first threshold;
    determining that the elapsed time exceeds the time threshold; and
    then, actuating a second countermeasure;
    wherein the countermeasures include actuating a vehicle climate control subsystem and opening at least one vehicle window.

11. The method of claim 10, wherein the countermeasures further include deactivating the propulsion subsystem and opening a vehicle hood.

12. The method of claim 10, further comprising actuating the countermeasure of opening the vehicle window when one of a precipitation sensor detects that there is substantially no precipitation and an occupant sensor detects that the vehicle is unoccupied.

13. The method of claim 10, wherein the countermeasures further include deactivating the propulsion subsystem, further comprising actuating an electric coolant subsystem to circulate a propulsion coolant when the propulsion subsystem is deactivated.

14. The method of claim 10, wherein the countermeasures further include deactivating the propulsion subsystem, further comprising moving the vehicle to a safe stopping zone before deactivating the propulsion system and opening the vehicle hood.

15. The method of claim 10, further comprising determining whether the vehicle is occupied and to actuate the climate control system only when the vehicle is not occupied.

16. The method of claim 10, wherein the countermeasures further include deactivating the propulsion subsystem and opening a vehicle hood, further comprising actuating the countermeasures in a predetermined sequence, the sequence being actuating the climate control subsystem, opening the vehicle window, moving to a safe stopping zone and deactivating the propulsion system, and opening the vehicle hood.

17. The method of claim 10, further comprising actuating another countermeasure when the temperature exceeds a second threshold.

18. The method of claim 10, wherein the temperature is at least one of a cylinder head temperature and an engine coolant temperature.

19. The system of claim 1, wherein the time threshold is based at least in part on a property of an engine of the propulsion subsystem.

20. The method of claim 10, wherein the time threshold is based at least in part on a property of an engine of the propulsion subsystem.

* * * * *